United States Patent [19]
Kanno et al.

[11] Patent Number: 5,260,810
[45] Date of Patent: Nov. 9, 1993

[54] IMAGE PROCESSING APPARATUS WITH IMPROVED DITHERING SCHEME

[75] Inventors: Hiroki Kanno, Yokohama; Hitoshi Yoneda, Kawasaki, both of Japan

[73] Assignee: Kabushiki Kaisha Toshiba, Kawasaki, Japan

[21] Appl. No.: 785,788

[22] Filed: Oct. 31, 1991

[30] Foreign Application Priority Data

Nov. 16, 1990 [JP] Japan ................. 2-308472

[51] Int. Cl.$^5$ ............................................. H04N 1/40
[52] U.S. Cl. ........................................ 358/462; 358/455
[58] Field of Search ............... 358/462, 455–457, 358/426, 428–429, 261.1–261.3; 382/56, 50, 51, 52

[56] References Cited

U.S. PATENT DOCUMENTS

| | | | |
|---|---|---|---|
| 4,403,257 | 9/1983 | Hsieh | 358/462 |
| 4,999,629 | 3/1991 | Katsuta | 358/462 |
| 5,014,124 | 5/1991 | Fujisawa | 358/462 |
| 5,051,841 | 9/1991 | Bowers et al. | 358/455 |
| 5,107,346 | 4/1992 | Bowers et al. | 358/455 |
| 5,164,717 | 11/1992 | Wells et al. | 358/455 |

OTHER PUBLICATIONS

R. Floyd et al., "An Adaptive Algorithm for Spatial Greyscale", Proceeding of the S.I.D., vol. 17, Second Quarter 1976, pp. 75–77.

*Primary Examiner*—Stephen Brinich
*Attorney, Agent, or Firm*—Foley & Lardner

[57] ABSTRACT

This invention utilizes the fact that "a maximum density difference in a window within a predetermined range including a pixel of interest is large for a character region, and is small for a photograph region." A maximum density difference of an image within a predetermined range is calculated as a feature amount. A quantization error of pixels around a pixel of interest is calculated, and then, a correction amount is calculated by proportionally distributing the quantization error in accordance with the feature amount calculated by a feature amount calculator. The correction amount is added to an image signal of the pixel of interest to form a compensation image signal, and the compensation image signal is quantized.

13 Claims, 4 Drawing Sheets

IMAGE PROCESSING APPARATUS WITH IMPROVED DITHERING SCHEME

BACKGROUND OF THE INVENTION

1. Field of the Invention

The present invention relates to an image processing apparatus which can perform quantization processing of a document image including both a character portion and a photograph portion while maintaining a high resolution of the character portion and a high gray scale characteristic of the photograph portion.

2. Description of the Related Art

In general, in an image processing apparatus such as a document image processing apparatus which can process not only code data but also image data, when image data are read by a reading means such as a scanner, image data of, e.g., characters, graphs, and the like having a contrast are subjected to simple quantization using a fixed threshold value, and image data of, e.g., photographs having a gray scale are subjected to quantization by a pseudo gray scale means such as a dithering method. The reason why such processing operations are performed is as follows. That is, when read image data are uniformly subjected to simple quantization processing using a fixed threshold value, image quality is not degraded in a character/line region since the resolution is preserved. However, image quality is degraded in a photograph region since the gray scale characteristic cannot be preserved. On the other hand, when read image data are uniformly subjected to gray scale processing by, e.g., a systematic dithering method, image quality is not degraded in a photograph region since the gray scale characteristic can be preserved. However, an image with poor image quality is formed in a character/line region since the resolution is impaired.

In this manner, when uniform quantization processing is applied to read image data, image qualities of regions having different features cannot be simultaneously satisfied.

As a means for solving such a problem, an "error diffusion method" as a quantization method which can satisfy a gray scale characteristic of a photograph image region, and has a better resolution of a character/line region than the systematic dithering method has been proposed. In this "error diffusion method", as described in the article entitled "An Adaptive Algorithm for Spatial Gray Scale" appearing in the journal "Proceeding of the S.I.D Vol. 17 2 Second Quarter 1976 p.p. 75–77", a product of a quantization error obtained when a pixel of interest is quantized by a given threshold value, and a predetermined weighting coefficient is diffused to non-quantized pixels in a predetermined region around the pixel of interest, and when the non-quantized pixels are quantized, quantization is performed while adding the diffused quantization error as a correction value.

More specifically, the "error diffusion method" diffuses a quantization error caused upon quantization of a pixel of interest to surrounding pixels to compensate for the error, thereby minimizing the quantization error. Therefore, when an input image places an importance on the gray scale as in a photograph image, quantization processing which can sufficiently satisfy the gray scale characteristic can be performed.

However, even when the "error diffusion method" is employed, in an image such as a character/line which places an importance on the resolution rather than the gray scale characteristic, the resolution of a character portion is impaired due to error correction processing.

As described above, even when the "error diffusion method" is employed, since the same quantization processing is performed for a document image including both a character region and a photograph region, processing according to features of the respective regions cannot be performed.

SUMMARY OF THE INVENTION

It is an object of the present invention to provide an image processing apparatus which can improve image quality by executing quantization processing of image data according to features of images, and can improve processing efficiency in various image processing operations by executing processing according to the feature of images.

In order to achieve the above object, an image processing apparatus of the present invention comprises quantization means for quantizing image data of a pixel of interest in an image to be processed, quantization error calculation means for calculating a quantization error between binary data quantized by the quantization means, and the image data, feature amount calculation means for calculating a feature amount representing a feature of an image on the basis of image data within a predetermined range corresponding to surrounding pixels of the pixel of interest, error correction means for correcting the quantization error calculated by the quantization error calculation means in accordance with the feature amount calculated by the feature amount calculation means, weighting coefficient generation means for generating a weighting coefficient, weighted error calculation means for calculating a weighted error for correcting image data of the surrounding pixels on the basis of the weighting coefficient generated by the weighting coefficient generation means, and a correction error value calculated by the error correction means, error storage means for storing the weighted error calculated by the weighted error calculation means, correction amount calculation means for correcting the weighted error stored in the error storage means in accordance with the feature amount calculated by the feature amount calculation means so as to calculate an error correction amount, and correction means for correcting the image data of the pixel of interest on the basis of the error correction amount calculated by the correction amount calculation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 5 show an embodiment of the present invention, in which:

FIG. 1 is a diagram for explaining the principle of quantization processing;

FIG. 2 is a schematic block diagram showing an arrangement of an image processing apparatus;

FIG. 3 is a view showing the concept of a pixel region in image processing;

FIG. 4 is a block diagram showing an arrangement of pattern feature detector 10; and FIG. 5 is a timing chart showing an operation of pattern feature detector 10.

DETAILED DESCRIPTION OF THE PREFERRED EMBODIMENTS

An embodiment of the present invention will be described below with reference to the accompanying drawings.

Figure 1:
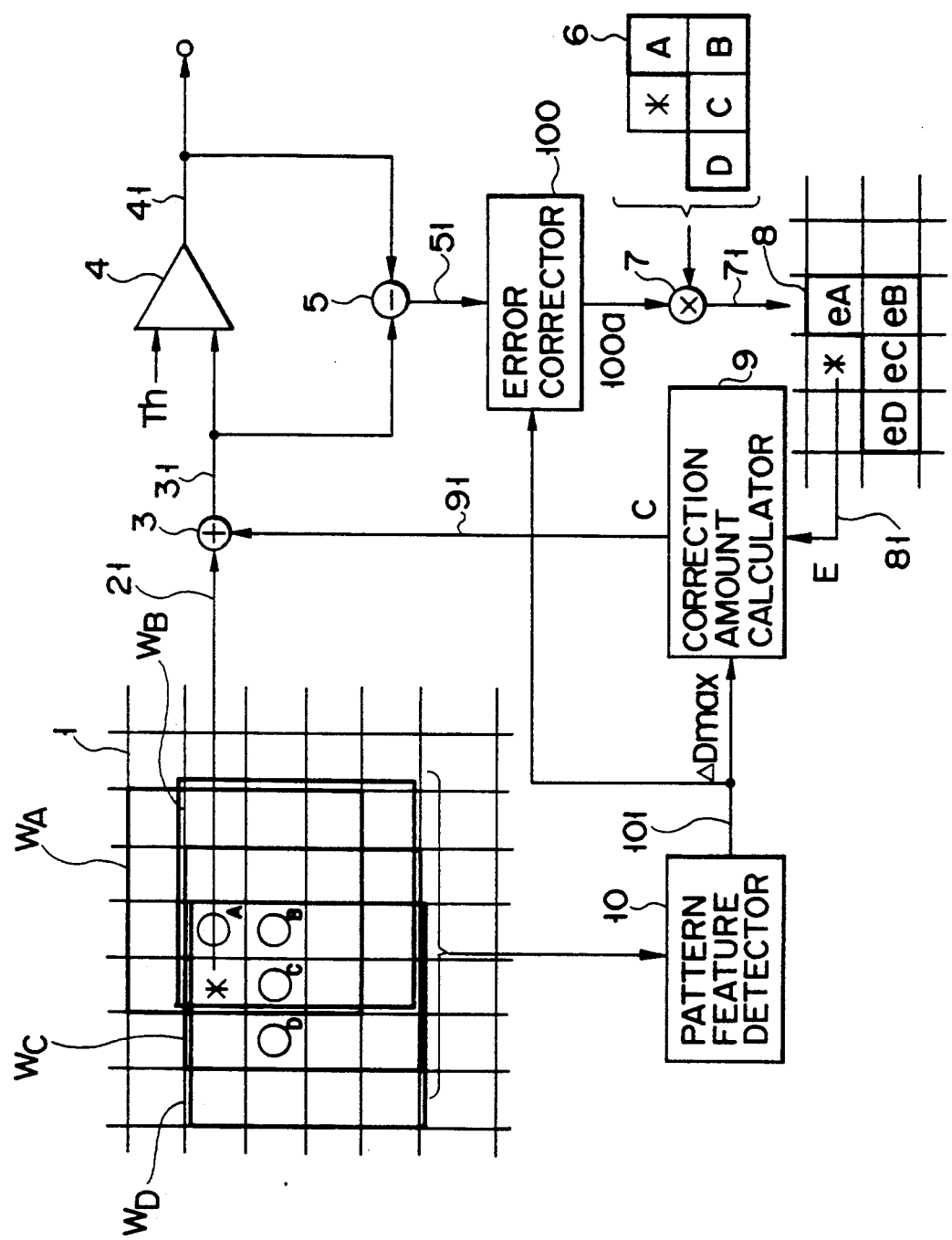

FIG. 1 shows the principle of a quantization processing method according to the present invention.

In FIG. 1, line buffer 1 stores image data of an image to be processed, and "*" indicates the position of a pixel of interest in line buffer 1. Input image signal 21 read out from line buffer 1 is supplied to corrector 3.

Corrector 3 corrects image data of the pixel of interest "*", and compensation image signal 31 corrected by corrector 3 is supplied to digitizer 4 and quantization error calculator 5.

Digitizer 4 can comprise a comparator for quantizing compensation image signal 31 (corrected image data of the pixel of interest "*") with predetermined threshold value Th. Binary image signal 41 quantized by digitizer 4 is supplied to an external device as a result of quantization processing, and is also supplied to quantization error calculator 5.

Quantization error calculator 5 subtracts binary image signal 41 from compensation image signal 31 to calculate a quantization error of the quantized pixel of interest "*". Quantization error signal 51 calculated by quantization error calculator 5 is supplied to error corrector 100.

Error corrector 100 corrects quantization error signal 51 on the basis of a feature amount signal (to be described later), and compensation quantization error signal 100a corrected by error corrector 100 is supplied to weighted error calculator 7.

Weighted error calculator 7 receives a weighting coefficient stored in weighting coefficient memory 6 as weighting coefficient generation means, and compensation quantization error signal 100a, and multiplies compensation quantization error signal 100a with the weighting coefficient to calculate a weighted error. Weighted error signal 71 calculated by weighted error calculator 7 is supplied to error memory 8, and is stored as the weighted error.

The weighted error stored in error memory 8 is supplied to correction amount calculator 9 as image correction signal 81.

Pattern feature detector 10 calculates a maximum density difference in a predetermined region (a portion surrounded by bold frames $W_A$, $W_B$, $W_C$, and $W_D$) of line buffer 1 on the basis of image data in the region. Feature amount signal (maximum density differential signal) 101 from pattern feature detector 10 is supplied to correction amount calculator 9 and error corrector 100.

Correction amount calculator 9 corrects image correction signal 81 from error memory 8 in accordance with feature amount signal 101 from pattern feature detector 10, and outputs correction amount signal 91.

Input image signal 21 from line buffer 1 is corrected by corrector 3 in accordance with correction amount signal 91, and is then supplied to digitizer 4 and quantization error calculator 5.

The quantization processing method of the present invention with the above arrangement will be described in detail below.

Input image signal 21 obtained by reading an image by an input device such as a scanner is corrected in accordance with correction amount signal 91 in corrector 3, and is then output as compensation image signal 31.

Compensation image signal 31 is compared with quantization threshold value Th by digitizer 4, and is then output as binary image signal 41. For example, hex "80" is used as quantization threshold value Th. When compensation image signal 31 is larger than quantization threshold value Th, "1" (black pixel) is output as binary image signal 41; when it is smaller than threshold value Th, "0" (white pixel) is output as binary image signal 41.

Binary image signal 41 is compared with correction image signal from corrector 3 by quantization error calculator 5, thus obtaining the difference between the two signals. As a result, quantization error signal 51 is output.

Quantization error signal 51 is corrected by error corrector 100 on the basis of feature amount signal 101 from pattern feature detector 10, and the corrected signal is output as compensation quantization error signal 100a.

Error corrector 100 may comprise a ROM including a conversion table for outputting signal 100a in accordance with input signals 51 and 101.

Compensation quantization error signal 100a is multiplied with weighting coefficients A, B, C, and D (A=7/16, B=1/16, C=5/16, and D=3/16) stored in weighting coefficient memory 6, thus calculating weighted error signals 71.

In weighting coefficient memory 6 in FIG. 1, "*" indicates the position of the pixel of interest, and the quantization error of the pixel of interest "*" is multiplied with weighting coefficients A, B, C, and D, thereby calculating weighted errors of four pixels (pixels corresponding to the positions of weighting coefficients A, B, C, and D) around the pixel of interest "*".

Weighted error signals 71 calculated by weighted error calculator 7 and representing weighted errors for four pixels are added and stored in areas $e_A$, $e_B$, $e_C$, and $e_D$ of error memory 8 shown in FIG. 1 with respect to the pixel of interest "*". Error memory 8 outputs, as image correction signal 81, a signal at the position of the pixel of interest "*", and obtained by accumulating the weighted errors of a total of four pixels calculated in the above-mentioned procedure.

Feature amount signal 101 is obtained as follows. Pattern feature detector 10 calculates maximum density differences of the image densities of four pixels ($\bigcirc_A$, $\bigcirc_B$, $\bigcirc_C$, and $\bigcirc_D$) around the pixel of interest "*" within a 4×4 window (portion surrounded by bold frames $W_A$, $W_B$, $W_C$, and $W_D$), and then calculates feature amount signal 101 based on an average value of these differences.

Correction amount signal 91 is generated by correction amount calculator 9 from image correction signal 81 from error memory 8 on the basis of feature amount signal 101 from pattern feature detector 10.

An image processing apparatus which has the quantization processing function of the present invention will be described below.

Figure 2:
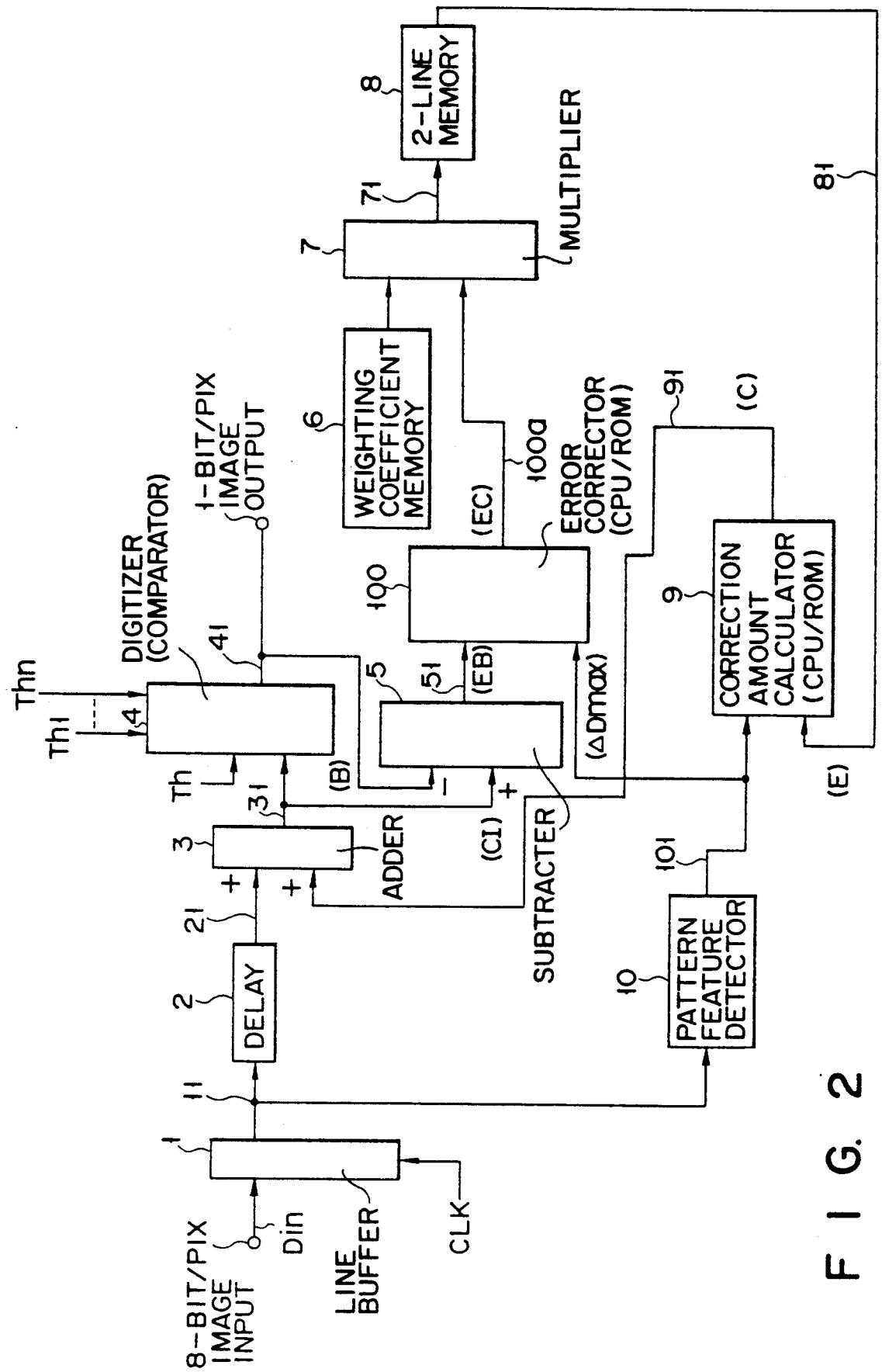

FIG. 2 is a schematic diagram showing an arrangement of the image processing apparatus.

The image processing apparatus fetches image data Din obtained by reading an original by a reading device such as an image scanner as 8-bit digital data per pixel, and quantizes it.

Line buffer 1 temporarily stores obtained image data Din, and supplies it to the following image processing (quantization processing).

Delay 2 receives image signal 11 output from line buffer 1 in synchronism with predetermined clock CLK, and delays it by a predetermined timing (i.e., a time required from when feature amount signal 101 (to be described later) is calculated until correction amount signal 91 is output).

Corrector 3 comprises an adder, and corrects image data of a pixel of interest. More specifically, adder 3 adds image signal 21 delayed by delay 2, and correction amount signal 91 from correction amount calculator 9 (to be described later), and outputs compensation image signal 31.

Digitizer 4 compares compensation image signal 31 from corrector 3 with predetermined threshold value Th, and outputs binary image signal 41. In this case, if compensation image signal 31 is larger than quantization threshold value Th, "1" (black pixel) is output as binary image signal 41; otherwise, "0" (white pixel) is output as binary image signal 41.

Subsequently, a quantization error caused in the quantization processing is calculated. Quantization error calculator 5 comprises a subtracter, and performs processing for subtracting binary image signal (B) 41 output from digitizer 4 from compensation image signal (CI) 31 output from adder 3, thereby calculating quantization error signal (EB) 51.

Quantization error signal (EB) 51 is given by:

$$EB = CI - B \quad (1)$$

Error corrector 100 comprises a CPU and/or a ROM, and corrects quantization error signal 51 from subtracter 5 using feature amount signal 101, thereby calculating compensation quantization error signal (EC) 100a.

Compensation quantization error signal (EC) 100a is given by:

$$EC = EB \times (1 - (\Delta Dmax)norm) \quad (2)$$

$(\Delta Dmax)_{norm}$ will be described later.

From equation (2), when surrounding pixels are present in, e.g., a character/line image region, the value of compensation quantization error signal (EC) 100a is decreased, and a quantization error amount diffused to the character/line image region is decreased. Therefore, a resolution of, e.g., a character is preserved.

Contrary to this, in a photograph image region, the value of compensation quantization error signal (EC) 100a is almost equal to quantization error signal (EB) 51, and an error can be compensated for, thus preserving a gray scale.

Weighted error calculator 7 comprises a multiplier, and multiplies signal 100a corresponding to quantization error signal (EB) 51 with weighting coefficients stored in weighting coefficient memory 6, thereby outputting weighted error signals 71.

Weighting coefficient memory 6 generates the above-mentioned four weighting coefficients (e.g., A=7/16, B=1/16, C=5/16, and D=3/16) in accordance with the positions corresponding to four pixels around the pixel of interest, and comprises, e.g., a memory. In this embodiment, weighted errors of the four pixels are respectively given by:

$$e_A = A \times EC \quad (3)$$

$$e_B = B \times EC \quad (4)$$

$$e_C = C \times EC \quad (5)$$

$$e_D = D \times EC \quad (6)$$

In this case, $e_B$ may be calculated by:

$$e_B = EC - (e_A + e_C + e_D) \quad (7)$$

Weighted errors $e_A$, $e_B$, $e_C$, and $e_D$ are respectively stored at the corresponding positions of error memory 8.

Error memory 8 comprises, e.g., a 2-line memory. A signal read out from the position of the pixel of interest "*" of 2-line memory 8 serves as image correction signal 81. The already processed weighted errors for four pixels are stored at the position of the pixel of interest "*" of 2-line memory 8.

Parallel to the above-mentioned operation, pattern feature detector 10 calculates feature amount signal (maximum density differential signal $\Delta Dmax$) 101 on the basis of image signals in a local region with respect to four pixels around the pixel of interest "*" in line buffer 1. Feature amount signal 101 represents a feature of an image, and is an amount representing whether the image signal in the local region indicates a nature unique to a character portion (a character/line image region) or indicates a feature as a photograph portion (photograph image region).

Figure 3:
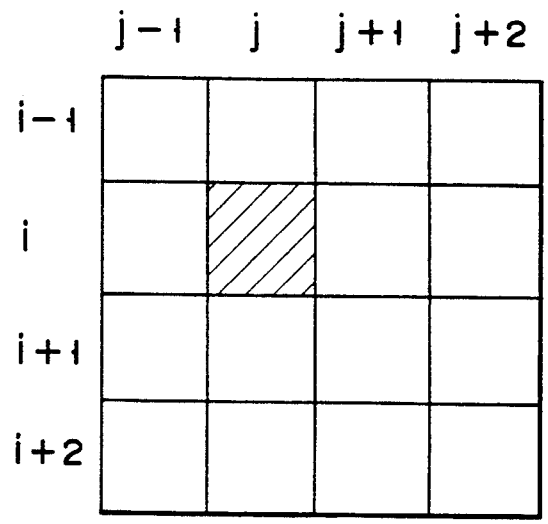

More specifically, pattern feature detector 10 calculates maximum values and minimum values of the image densities of fur pixels around an objective pixel (a pixel indicated by hatching) within a 4×4 region, as shown in FIG. 3, on the basis of image signals output from line buffer 1. Detector 10 then performs subtraction of these values to calculate maximum density differential signals with n the 4×4 region. Detector 10 extracts an average of the maximum density differential signals of four pixels as feature amount signal 101. Therefore, line buffer 1 comprises a line memory having at least a 5-line capacity.

Correction amount calculator 9 obtains correction amount signal 91 (C in equation (10)) from image correction signal 81 supplied from 2-line memory 8 using, as a parameter, feature amount signal 101 calculated by pattern feature detector 10.

Correction amount calculator 9 may comprise a ROM including a conversion table for outputting output signal 91 in accordance with input signals 81 and 101, or a CPU for calculating equations (9) and (10) to be described later.

Feature amount signal 101 is obtained as follows.

Figure 4:
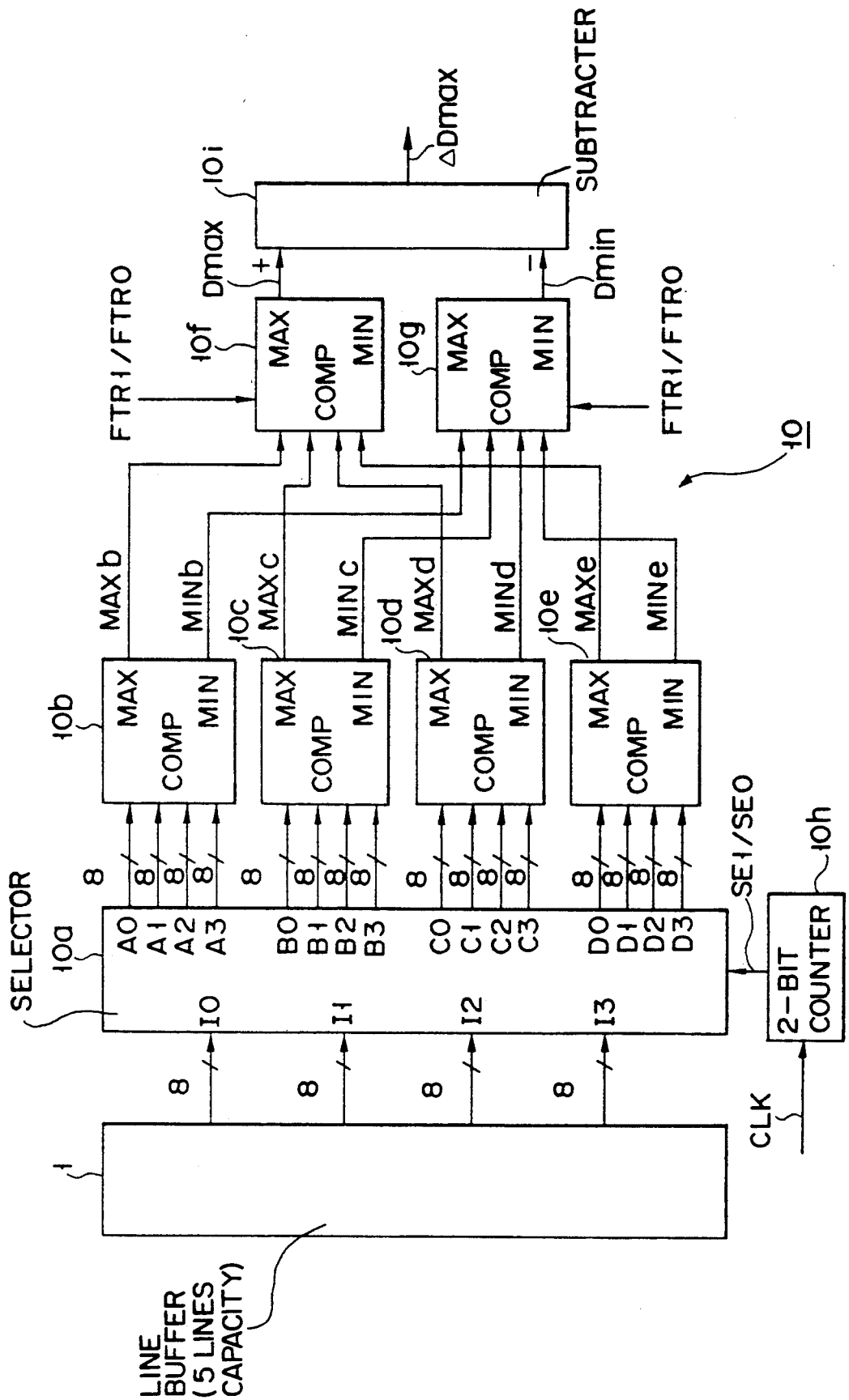

FIG. 4 shows an arrangement of pattern feature detector 10.

Pattern feature detector 10 obtains maximum values (MAXb to MAXe) and minimum values (MINb to MINe) of the densities in a 4×4 pixel region including the pixel of interest with respect to the pixel of interest (* in buffer 1 in FIG. 1) in an image to be processed, and performs subtraction of these values to obtain a maximum density difference.

Figure 5:
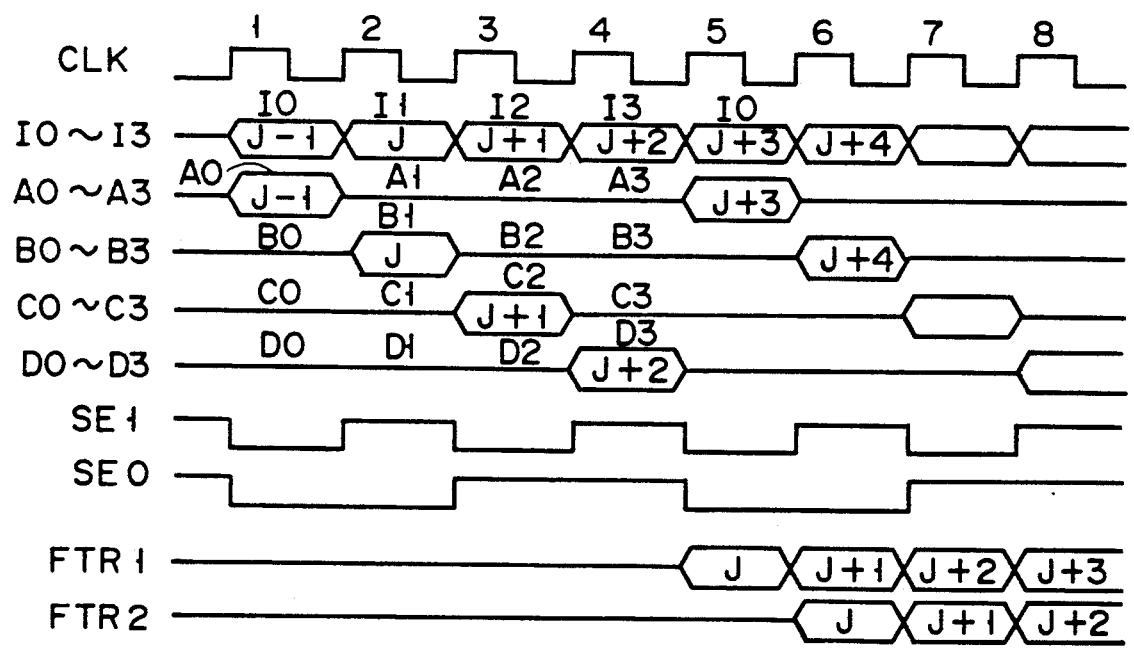

As shown in the timing chart of FIG. 5, pattern feature detector 10 sequentially distributes image data (8 bits/pixel) sequentially input in units of four pixels in the column direction from line buffer 1 in synchronism with clock CLK to comparators 10b, 10c, 10d, and 10e via selector 10a. Distribution of image data input in units of columns to comparators 10b, 10c, 10d, and 10e by selector 10a is controlled by selection signals SE1 and SE0 from 2-bit counter 10h which is operated in response to clock CLK.

Comparators 10b, 10c, 10d, and 10e compare image data in units of four pixels in the column direction, thus obtaining maximum densities (MAX terminal outputs), and minimum densities (MIN terminal outputs) in the corresponding columns.

Comparators 10f and 10g receive signals from comparators 10b, 10c, 10d, and 10e at a timing of FTR1, and then obtain maximum and minimum values on the basis of the maximum and minimum values obtained in the column direction.

With the above-mentioned comparison processing, maximum value Dmax and minimum value Dmin of the densities in the 4×4 pixel region shown in FIG. 3 are obtained, and are output at a timing of FTR2.

Subtracter 10i calculates maximum density difference $\Delta Dmax$ as the difference between maximum and minimum values Dmax and Dmin of the densities obtained as described above. Maximum density difference $\Delta Dmax$ is given by:

$$\Delta Dmax = Dmax - Dmin \quad (8)$$

In this manner, maximum density differences ($\Delta Dmax_A$, $\Delta Dmax_B$, $\Delta Dmax_C$, and $\Delta Dmax_D$) of four pixels ($\bigcirc_A$, $\bigcirc_B$, $\bigcirc_C$, and $\bigcirc_D$) around the pixel of interest "*" shown in FIG. 1 are obtained. Average $\Delta Dmax_{AVE}$ of these differences is calculated by correction amount calculator 9, and is output as feature amount signal 101.

More specifically, average $\Delta Dmax_{AVE}$ is given by:

$$\Delta Dmax_{AVE} = (\Delta Dmax_A + \Delta Dmax_B + \Delta Dmax_C + \Delta Dmax_D)/4 \quad (9)$$

A calculation of correction amount signal 91 will be explained below.

Correction amount signal (C) 91 is calculated from image correction signal (E) 81 using feature amount signal ($\Delta Dmax_{AVE}$) 101 as a parameter in correction amount calculator 9.

Maximum density difference $\Delta Dmax_{AVE}$ is normalized in correction amount calculator 9 so as to fall within a range between "0 and 1". Correction amount signal (C) 91 is calculated by the following equation using normalized maximum density difference $(\Delta Dmax)_{norm}$:

$$C = E \times (1 - (\Delta Dmax)norm) \quad (10)$$

The maximum density difference is large in a character portion having a high contrast, and is small in a photograph portion having a gray scale. More specifically, correction amount signal 91 calculated by equation (10) has a small value in a character/line image region, and has a large value in a photograph image region.

Therefore, when an image signal is corrected by adder 3 on the basis of the correction amount obtained in this manner, a character portion can be quantized to have a high resolution since the correction amount is small, and a photograph portion can be quantized to have a high gray scale characteristic since an error can be compensated based on quantization errors of surrounding pixels.

As described above, even in a document image including both character and photograph images, quantization processing can be adaptively performed for regions of these images.

More specifically, by utilizing the fact that a maximum density difference in a window within a predetermined range including a pixel of interest is large for a character region, and is small for a photograph region, whether the pixel of interest is present in the character or photograph region can be discriminated based on the maximum density difference of an image within the predetermined range. Upon quantization, when the pixel of interest is present in a photograph region, a correction image signal obtained by adding a quantization error of each surrounding pixel and an image signal of the pixel of interest is quantized by a predetermined threshold value, and when the pixel of interest is present in a character region, the image signal itself of the pixel of interest is quantized by the predetermined threshold value. In this manner, since quantization processing can be performed by methods suitable for features of images in the respective regions, a character portion can be quantized to have a high resolution, and a photograph portion can be quantized to have a high gray scale characteristic. Therefore, degradation of a resolution of a character image in the conventional "error diffusion method" can be suppressed, and quantization processing can be executed to simultaneously satisfy the resolution of a character image and the gray scale of a photograph image.

According to the present invention, since an object image is not completely separated into a character region and a photograph region, no erroneously judged region is present unlike in conventional image area separation processing, and hence, degradation of image quality caused by erroneous judgment will not occur. More specifically, a region which tends to be erroneously judged in a conventional method such as an edge portion having a slow density gradient in a photograph region can be subjected to gray scale processing while preserving an edge portion.

For example, in the above embodiment, in quantization processing, when a pixel of interest is present in a photograph region, a compensation image signal obtained by adding a quantization error of each surrounding pixel and an image signal of the pixel of interest is quantized by a predetermined threshold value, and when the pixel of interest is present in a character region, the image signal itself of the pixel of interest is quantized by the predetermined threshold value. However, the present invention is not limited to this. For example, a correction amount of the image signal of the pixel of interest may be calculated using a quantization error of each surrounding pixel using a maximum density difference of the surrounding pixel as a parameter. More specifically, the value of the maximum density difference of each of surrounding four pixels may be normalized to fall within a range between 0 and 1, and a correction amount may be given by:

(Quantization error of surrounding pixel) × (11)

(average maximum density difference of one to four pixels)

In this manner, since the correction amount can be small in a character region, and becomes almost equal to the quantization errors of the surrounding pixels in a photograph region, a compensation image signal obtained by adding this correction amount and the image signal of the pixel of interest may be quantized by a predetermined threshold value.

A reference range for extracting a feature amount is not limited to a 4×4 region, but may be desirably changed.

As a formula for calculating a correction amount, the following equation may be used in place of equation (10) in the above embodiment:

$$C = E/\Delta Dmax \qquad (12)$$

Furthermore, in equations (10) and (12), maximum density difference $\Delta Dmax$ may be replaced with a "maximum density difference/average density" or a feature amount having different natures in character and photograph portions such as a "Laplacian value" as a quadratic differential value of an image.

In the above embodiment, a binary output (1-bit/pixel) is obtained. However, a multi-value output (n-bit/pixel) may be performed by setting a plurality of threshold values Th (Th1 to Thn in FIG. 2) in digitizer 4. In this case, optimal gray scale expression corresponding to a multi-value laser printer, a thermal transfer printer, or the like can be realized.

Furthermore, according to the present invention, the value of a feature amount (101), and the judgment threshold value (Th) are obtained on the basis of an image signal read by, e.g., a scanner, i.e., an amount corresponding to a reflectance of image data. However, the feature amount (101) may be obtained based on a value converted into an image density (a value obtained by logarithmically converting a reciprocal value of the reflectance; or based on a value obtained by weighting the converted value based on visual characteristics of man).

When three systems of the arrangement shown in FIG. 2 are prepared in correspondence with three primary colors (red, green, and blue; or cyan, magenta, and yellow), color processing can be realized.

In summary, an essential feature of the embodiment of FIG. 1 resides in a combination of the following points:

(1) Feature amount 101 ($\Delta Dmax$) calculated by pattern feature detector 10 is used to compensate for compensation quantization error signal 100a (EC) calculated by error corrector 100 as well as correction amount signal 91(C) calculated by correction amount calculator 9;

(2) Error signal 100a (EC) calculated by error corrector 100 is compensated for by feature amount 101 ($\Delta Dmax$) obtained from a window in which a specific pixel to which the calculated error is diffused and peripheral pixels around the specific pixel are contained (Note that the feature amount obtained from another window containing a target pixel (*) to be digitized and its peripheral pixels (A–D) is not used to compensate for error signal 100a (EC).); and (3) Correction amount signal 91(C) calculated by correction amount calculator 9 is compensated for by feature amount 101 ($\Delta Dmax$) obtained from the window containing the target pixel (*) to be digitized and its peripheral pixels (A–D).

Various other changes and modifications may be made within the spirit and scope of the invention.

As described above, according to the present invention, since quantization processing can be executed so as to simultaneously satisfy the resolution of a character image and the gray scale of a photograph image, an image processing apparatus which can improve image quality by executing quantization processing of image data according to a feature of the image, and can improve processing efficiency in various image processing operations by executing processing according to the feature of the image can be provided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image processing apparatus for processing image information having a plurality of pixel data each formed of n-bit where n is a natural number more than one, comprising:

first preparing means for preparing from the image information a first window containing a target pixel and its peripheral pixels;

means for converting pixel data of said target pixel into pixel data of m-bit where m is a natural number less than said n and more than zero;

first calculating means for calculating an error between the pixel data of said target pixel and the m-bit pixel data converted by said converting means;

second preparing means for preparing from the image information a second window being different from said first window, said second window containing a plurality of peripheral pixels around said target pixel and other peripheral pixels around the peripheral pixels, where each of said peripheral pixels is to be diffused according to the error calculated by said first calculating means;

second calculating means for calculating feature data of each of said first and second windows; the calculated feature data of said first window representing a contrast of an image defined by the pixel data in said first window, and the calculated feature data of said second window representing a contrast of an image defined by the pixel data in said second window;

first correcting means for correcting the error calculated by said fist calculating means in accordance with the calculated feature data of said second window containing pixels to be diffused, when the error is to be diffused to the pixels in said second window;

means for storing the error, corrected by said first correcting means, with respect to each pixel in said second window;

third calculating means for calculating a correction amount used when said converting means converts the pixel data of said target pixel, in accordance with the error stored in said storing means and the calculated feature data of said first window containing said target pixel; and second correcting means for correcting the pixel data of said target pixel to be converted by said converting means in accordance with the correction amount calculated by said third calculating means.

2. An apparatus according to claim 1, wherein said first correcting means includes means for performing the following relation:

$$EC = EB * [1 - (\Delta Dmax)norm]$$

where EC denotes the error corrected by said first correcting means, EB denotes a difference between the error calculated by said first calculating means and the calculated feature data of said second window, * denotes a multiplication sign, and $(\Delta Dmax)norm$ denotes a value of the feature data which is normalized such that the value falls between "0" and "1".

3. An apparatus according to claim 1, wherein said third calculating means includes means for performing the following relation:

$$C = E * [1 - (\Delta Dmax)norm]$$

where C denotes the correction amount calculated by said third calculating means, E denotes the error stored in said storing means, * denotes a multiplication sign, and $(\Delta Dmax)norm$ denotes a value of the feature data which is normalized such that the value falls between "0" and "1".

4. An apparatus according to claim 1, wherein said third calculating means includes means for performing the following relation:

$$C = E/\Delta Dmax$$

where C denotes the correction amount calculated by said third calculating means, E denotes the error stored in said storing means, / denotes a division sign, and $\Delta Dmax$ denotes a value of the feature data.

5. An apparatus according to claim 1, further comprising:

means for weighting the error corrected by said first correcting means by a predetermined weighting coefficient so as to provide a weighted error which is then stored in said storing means.

6. An apparatus according to claim 1, further comprising:

means for delaying application of the pixel data to said second correcting means such that said second correcting means simultaneously receives the correction amount calculated by said third calculating means and the delayed pixel data corresponding to said correction amount.

7. An apparatus according to claim 6, wherein said second correcting means includes means for combining the correction amount with the delayed pixel data.

8. An apparatus according to claim 1, wherein said second calculating means includes:

means for detecting maximum and minimum values of the pixels prepared by either of said first and second preparing means; and means for calculating a difference between the maximum and minimum values detected by said detecting means so as to provide the feature data of either of said first and second windows.

9. An apparatus according to claim 1, wherein said second calculating means includes:

first detecting means for detecting maximum values and minimum values of the pixels prepared by either of said first and second preparing means;

second detecting means for detecting an extreme maximum value of the maximum values of the pixels and an extreme minimum value of the minimum values of the pixels; and means for calculating the feature data of either of said first and second windows in accordance with a difference between the extreme maximum value and the extreme minimum value.

10. An apparatus according to claim 1, wherein said first and second preparing means include means for temporarily storing the pixel data of said first and second windows.

11. An apparatus according to claim 1, wherein said converting means includes means for comparing the pixel data of n-bit with a predetermined reference value to generate the m-bit pixel data.

12. An apparatus according to claim 11, wherein said first calculating means includes means for subtracting the m-bit pixel data from the n bit pixel data to generate the error.

13. An image processing apparatus for processing image information having a plurality of pixel data each formed of n-bit where n is a natural number more than one, comprising:

means for preparing from the image information a first window containing a target pixel and its peripheral pixels;

means for converting pixel data of said target pixel into pixel data of m-bit where m is a natural number less than said n and more than zero;

means for calculating an error between the pixel data of said target pixel and the m-bit pixel data converted by said converting means;

means for preparing from the image information a second window being different from said first window, said second window containing a plurality of peripheral pixels around said target pixel and other peripheral pixels around the peripheral pixels, where each of said peripheral pixels is to be diffused according to the error calculated by said error calculating means;

means for calculating feature data of each of said first and second windows, the calculated feature data of said first window representing a contrast of an image defined by the pixel data in said first window, and the calculated feature data of said second window representing a contrast of an image defined by the pixel data in said second window;

means for correcting the error calculated by said error calculating means in accordance with the calculated feature data of said second window containing pixels to be diffused, when the error is to be diffused to the pixels in said second window;

means for storing the error, corrected by said error correcting means, with respect to each pixel in said second window; and means for correcting the pixel data to be converted by said converting means in accordance with the error stored in said storing means.

* * * * *